United States Patent
Spies et al.

(10) Patent No.: US 11,480,648 B2
(45) Date of Patent: Oct. 25, 2022

(54) DEVICE AND METHOD FOR DETERMINING AT LEAST ONE POSITION OF A MOBILE TERMINAL

(71) Applicant: Bayerische Motoren Werke Aktiengesellschaft, Munich (DE)

(72) Inventors: Christian Spies, Munich (DE); Michael Karg, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/600,067

(22) Filed: May 19, 2017

(65) Prior Publication Data

US 2017/0254875 A1 Sep. 7, 2017

Related U.S. Application Data

(63) Continuation of application No. PCT/EP2015/059302, filed on Apr. 29, 2015.

(30) Foreign Application Priority Data

Nov. 20, 2014 (DE) ...................... 10 2014 223 668.1

(51) Int. Cl.
*G01S 5/02* (2010.01)
*G01C 21/12* (2006.01)
(Continued)

(52) U.S. Cl.
CPC ............ *G01S 5/0257* (2013.01); *G01C 21/12* (2013.01); *G01C 21/16* (2013.01); *G01C 21/20* (2013.01);
(Continued)

(58) Field of Classification Search
CPC ............................ G01S 5/0236; H04W 64/00
(Continued)

(56) References Cited

U.S. PATENT DOCUMENTS 5,519,760 A 5/1996 Borkowski
2007/0150195 A1 6/2007 Koskan et al.
(Continued)

FOREIGN PATENT DOCUMENTS

DE 10 2007 014 528 A1 10/2008
EP 1 865 286 A2 12/2007

OTHER PUBLICATIONS

International Search Report (PCT/ISA/210) issued in PCT Application No. PCT/EP2015/059302 dated Sep. 8, 2015 with English translation (Four (4) pages).
(Continued)

*Primary Examiner* — Kiet M Doan
(74) *Attorney, Agent, or Firm* — Crowell & Moring LLP (57) ABSTRACT

A device for determining at least one position of a mobile terminal includes at least one memory apparatus, a magnetometer sensor unit, a classification unit, and a position-determining unit to determine the position of the mobile terminal. The classification unit is configured to determine states, in particular operating states, of at least one electric motor and/or a vehicle driven by means of at least one electric motor using the magnetometer sensor data. The classification unit is also configured to store the determined states in the at least one memory apparatus. The position-determining unit reads out the states from the at least one memory apparatus and determines the at least one position of the mobile terminal with the help of the states.

14 Claims, 5 Drawing Sheets

(51) Int. Cl.
*G01C 21/16* (2006.01)
*G01C 21/20* (2006.01)
*H04W 4/02* (2018.01)
*H04W 64/00* (2009.01)

(52) U.S. Cl.
CPC ......... *H04W 4/025* (2013.01); *H04W 64/006* (2013.01)

(58) Field of Classification Search
USPC ........ 455/456.1, 456.6, 574, 88, 456.2, 418, 455/41.2; 370/252; 600/301, 479, 595
See application file for complete search history.

(56) References Cited

U.S. PATENT DOCUMENTS

| | | | |
|---|---|---|---|
| 2010/0144375 A1 | 6/2010 | Pfister et al. | |
| 2011/0093431 A1* | 4/2011 | Arbel | G06F 1/3237 706/57 |
| 2012/0071151 A1* | 3/2012 | Abramson | H04L 67/12 455/418 |
| 2013/0045759 A1* | 2/2013 | Smith | H04W 64/00 455/456.6 |
| 2013/0344859 A1* | 12/2013 | Abramson | G06Q 50/265 455/418 |
| 2014/0082952 A1 | 3/2014 | Fujiwara | |
| 2015/0004956 A1* | 1/2015 | Aksamit | H04W 4/025 455/418 |
| 2015/0130386 A1* | 5/2015 | Zumstein | H02K 5/18 318/490 |
| 2015/0148057 A1* | 5/2015 | Pakzad | H04W 52/0261 455/456.1 |
| 2016/0114687 A1* | 4/2016 | Ichikawa | B60L 53/122 701/22 |

OTHER PUBLICATIONS

German-language Written Opinion (PCT/ISA/237) issued in PCT Application No. PCT/EP2015/059302 dated Sep. 8, 2015 (Six (6) pages).

German-language Search Report issued in counterpart German Application No. 10 2014 223 668.1 dated Feb. 12, 2015 with partial English translation (Thirteen (13) pages).

Rehrl, K., et al., "Combined Indoor/Outdoor Smartphone Navigation for Public Transport Travellers," Proc. $3^{rd}$ Symp. LBS & TeleCartography, 2005 (Eight (8) pages).

\* cited by examiner

DEVICE AND METHOD FOR DETERMINING AT LEAST ONE POSITION OF A MOBILE TERMINAL

CROSS REFERENCE TO RELATED APPLICATIONS

This application is a continuation of PCT International Application No. PCT/EP2015/059302, filed Apr. 29, 2015, which claims priority under 35 U.S.C. § 119 from German Patent Application No. 10 2014 223 668.1, filed Nov. 20, 2014, the entire disclosures of which are herein expressly incorporated by reference.

BACKGROUND AND SUMMARY OF THE INVENTION

Embodiments of the invention relate to a device and a method for determining at least one position of a mobile terminal, in particular a smart phone.

Some systems determine the position of a mobile terminal directly with satellite-based signals. Such systems are known as global navigation satellite systems (GNSS) and comprise, among other things, the GPS system, the GLONASS and the Galileo and BeiDou systems, which are under development. However, these systems depend on receiving satellite signals because they determine the position by means of signal runtimes between satellite and the mobile terminal via multilateration. Obstacles can reflect said signals and the runtime increases, causing the position determining to be less accurate. By blocking the signals, in particular in buildings or underground, it is not possible to determine a position.

One option of remedying the disadvantages of GNSS systems is using systems that evaluate signals from nearby GSM towers or WiFi stations. This requires receiving the locations of nearby GSM towers and WiFi stations from a memory apparatus and then determining the relative position to said GSM towers and WiFi stations via triangulation. Such a method is described in U.S. Pat. No. 5,519,760 A in general, and in DE 10 2007 014 528 A1 for determining routes in subways. The disadvantage of these methods is that first a database has to be created with the positions of all GSM towers and WiFi stations. This mapping requires a high effort and is expensive. Furthermore, the individual GSM towers cannot always be clearly identified. The latter is the case, for example, when various GSM towers are combined into a so-called virtual access point, as is often the case with subway systems. Thus, individual access points can no longer be associated with a position, or only roughly associated with a position. The same applies analogously to WiFi stations.

Other systems require the setup of a new infrastructure. This is expensive and leads to an unnecessary occupation of frequency bands.

One way to overcome the disadvantages of systems that require external signal sources is the use of an inertial navigation system (INS). An INS uses a combination of accelerometers and gyroscopes to measure the movement of bodies that can freely move in space. This makes it theoretically possible to determine a position without the use of external signals if the starting position and orientation are known. In practice, however, there is the problem that over time, determining the position quickly loses accuracy due to sensor drift. Thus, INS is used primarily to bypass short signal failures of other navigation systems such as GNSS.

One of the objects of the embodiments of the invention is to provide a device or a method that addresses the aforementioned disadvantages. In particular, an object is to create a device for efficient position determining. A further object of the embodiments of the invention is to provide a device for position determining which is able to determine the position without additional location information. Furthermore, an object of the embodiments of the invention is to create a device that facilitates position determining in a public transportation vehicle in tunnels and at stations.

In particular, the objects of the embodiments of the invention are attained with a device including at least one memory apparatus, one magnetometer sensor unit to output magnetometer sensor data, a classification unit, and a position-determining unit to determine the position of the mobile terminal.

The classification unit is developed to determine states of at least one electric motor and/or a vehicle driven by means of at least one electric motor, using the magnetometer sensor data, and storing the determined states in the at least one memory apparatus.

The position-determining unit reads out the states from the at least one memory apparatus and, with the help of said states, determines the at least one position of the mobile terminal.

An electric motor is based on the principle that electric energy is converted into mechanical energy. To this end, the force exerted by a magnetic field on the current-carrying conductors of a coil is converted into mechanical energy. The resulting effects can be measured even outside of an electric motor using an appropriate sensor. For example, the amount of the magnetic flux density changes with the desired torque and/or the speed of the electric motor. Therefore, it is possible to determine the states of the electric motor by measuring the magnetic and/or electric fields (such as orientation or strength). A mobile terminal can be used to measure the effects.

Preferably, the components of the mobile terminal are highly integrated and the user can carry the mobile terminal, similar to a modern smart phone, for example. Such a modern smart phone usually has a magnetometer sensor to implement a digital compass. This may be a sensor to measure 9-degrees of freedom, such as the Invensense MPU-9250, which uses a Hall sensor to measure the magnetic flux density. Said magnetometer sensor unit can be used, for example, to measure the magnetic flux density or other characteristic field properties of the field induced by an electric motor, and transfer magnetometer sensor data to a classification unit. Alternatively, the magnetometer sensor data can be written into the memory of the mobile terminal.

It is furthermore possible to use a Foerster probe to measure the field properties.

The mobile terminal may implement a classification unit that receives the magnetometer sensor data and performs a classification of said magnetometer sensor data. To that end, states can be assigned to individual segments of the magnetometer sensor data. With the help of said states, the position-determining unit can then determine a position. Position determining may mean: determining an absolute position in space, and/or determining a relative position, and/or determining an event that is temporally related to a position.

Additionally, the user may be a subway passenger. When reaching his desired stop, the user is reminded to exit the train. A smart phone could determine the point in time solely from the data of a magnetometer sensor unit. The classification unit could determine the subway states. This may be the state during acceleration and/or during standstill of the vehicle. The position-determining unit, which can interpret each pair of acceleration- and standstill events as traveling a connection between two stations, would alert the user of his arrival in due time after a number of stations specified by the user have been passed.

Alternatively, the signals of GSM towers, WiFi stations and GPS satellites may be located in the receiving range of the mobile terminal may be used for more accurately determining the position. The signals can be used as additional information in the estimation of the position and thus improve the reliability of the estimate.

Alternatively, location data can be generated from the additional GSM tower signals and WiFi station signals to define a measure for the quality of the position estimate. Such location data are available via public interfaces to services, for example via interfaces in the Google Android system. The location data can then be used to determine a statement about the quality of the position estimate. It is an advantage that the user can be informed about the quality of the current estimate.

The position-determining unit can be developed for use of a deterministic or a non-deterministic method. For example, a deterministic decision tree may be used to determine the position. Alternatively, the position-determining unit may be developed for use of a probabilistic method, such as, for example Sequential Monte Carlo method, Dynamic Bayes Network, or a Kalman filter.

Alternatively, the position-determining unit may be developed to use a sequential Monte Carlo method, a cloud or a cluster of so-called particles is generated, which represent potential positions of the mobile terminal. Each particle is a tuple with at least two values, which comprise a weight and a point in the state space. The cluster as a whole is to represent the probability density in an initial state. By means of a model of the system dynamics, in the present case the states stored in the memory apparatus, each particle is then assigned one or a plurality of solution curves, e.g. positions. Proceeding from the measuring values such as, for example, the additional signal data, and the predictions about the position, the particle weights are adjusted. From this follows, in a sequential manner, an improved estimate of the evolution of the probability density in the state space. In this way, the initial composition of the cluster can be adapted to obtain more accurate results. The transition from the weighted particle cloud to the probability density can take place with methods of the non-parametric density estimate. This allows a position estimate that improves with the passing of multiple stations and the measurements that are obtained in the process.

The classification in the classification unit can use a support vector machine (SVM) or a linear discriminant analysis (LDA). To that end, a recorded signal path of a time interval of magnetometer sensor data is interpolated by a polynomial of the mth degree, with m=3 representing an advantageous choice. Together with other properties of the signal, such as the amplitude of the field strength over time or the change in slope of the field strength over time, the coefficients of this polynomial can be interpreted as point in an n-dimensional hyperspace. A SVN or LDA that was first trained with training data is then able to make a statement as to the state in which the electric motor or the vehicle driven by means of the electric motor is operating. The advantages are in the quick and reliable classification as well as the compact representation of the classification rules.

Alternatively, the device may comprise a classification unit that determines states from a finite quantity of states with a cardinality of less than 10, in particular less than 5. This has the advantage of simplifying the classification of the individual driving segments and therefore increasing the number of correctly recognized states.

The states could represent the operating states of the motor of a vehicle. Potential states would be ACTIVE and INACTIVE, with active describing the state in which an operating voltage is applied to the electric motor and INACTIVE describing the state where no operating voltage is applied. The advantages of such a selection of states is in the low loss of information due to an otherwise too high abstraction level and the low error quota in the classification because the state selection can be easily assigned to the magnetometer sensor data being used. Furthermore, a refinement of the state quantity, e.g. a detailed illustration of the operating states of the motor, is easily possible with advanced technology.

Alternatively, the states may be field states. For example, all values below a threshold value could count as a field state LOW and all values above a threshold value could count as a field state HIGH. In a further development, the field states could be INCREASING and CONSTANT, with INCREASING meaning that the signal values increase over time and CONSTANT meaning that the signal values remain constant over time. An advantage of such a selection of states is that no assumptions have to be made about external components such as the motor or the vehicle, and only the data on hand are used.

Alternatively, potential states may be ACCELERATE, which represents the driving segment from standstill to a constant speed or a braking process, and STANDING, which symbolizes the driving segment between the braking and the acceleration of the vehicle. Here, the advantages are in enriching the pure motor data with a semantics that puts said motor data into the context of the vehicle. This allows a simpler analysis of the data and thus a simpler development of the further components of the device in the context of determining the position of the vehicle.

What is more, CONSTANT DRIVE, with CONSTANT DRIVE representing that the vehicle moves at a nearly constant speed, and BRAKING, which states that the vehicle is actively performing a braking operation, may be potential states. With vehicles having a unit for reclaiming energy during braking, the state BRAKING can be recognized particularly efficiently. This is attributed to alternating effects of the unit for reclaiming energy and the magnetic field.

In addition to the magnetometer sensor data, meta-information related to the sensor data can be stored as well. This, for example, may be timestamps that allow a simple further processing of the data. There is also the option of performing calculations such as determining the amplitude or the slope, for example, parallel to the recording and to store them with the signal, which allows a more efficient use of free resources.

Alternatively, the mobile terminal may be capable of receiving network data that represents the network of a local public transportation system. These data can store the stations and connections including the corresponding driving times and distances in local public transportation. If the user of such a mobile terminal were to enter his starting position, his selected transportation means, and his end stop, the device could issue a warning to exit when the traveler has reached his destination stop. This is accomplished in that the position-determining unit determines how many stops there are with the selected transportation means between the starting location and the destination stop.

Further, the classifier compares the characteristic signal paths of the magnetometer sensor data from the memory apparatus to new measuring data. A classification can be performed based on a reference parameter, such as, for example, the amplitude of the signal. This has the advantage of a simple and quick classification.

Additionally, the at least one memory apparatus can be of such a nature that it stores the magnetometer sensory data as coefficients of an interpolating polynomial which, for example, can be used as coordinates in a hyperspace for the classification. This significantly reduces the memory requirement and is specifically for this reason especially advantageous in a mobile terminal, where there are usually memory bottlenecks.

In a further development, the mobile terminal can comprise at least one pressure gage. Using the sensor data of the pressure gage, it can be determined whether the mobile terminal or its user has moved to a different floor of a building. For example, descending to a subway station can be recognized. Furthermore, it is conceivable to recognize whether the user has moved to a different floor within a subway station. This could be an indication of changing to a different subway line. The classification unit can be developed to use pressure sensor data to determine pressure states. The position-determining unit can use said states to improve the accuracy in estimating the position.

Furthermore, the object of the invention is attained by a method for determining the position of a mobile terminal, in particular by means of a device as described in the preceding explanations, comprising the steps:

a) Detecting magnetic and/or electric field data of an electric motor;

b) Storing the magnetic and/or electric field data in at least one memory apparatus;

c) Classifying a state of the electric motor or a vehicle driven by means of the electric motor;

d) Storing the states in the at least one memory apparatus;

e) Determining a position of the mobile terminal with the help of the states in the at least one memory apparatus.

This results in advantages similar or identical to those already described in connection with the device.

The object of the invention is furthermore attained by a computer-readable memory medium that comprises executable instructions, which prompt a computer to implement the described method when said instructions are executed.

Other objects, advantages and novel features of the present invention will become apparent from the following detailed description of one or more preferred embodiments when considered in conjunction with the accompanying drawings, in which:

DETAILED DESCRIPTION OF THE DRAWINGS

In the description below, the same reference numerals are used for parts that are identical or function identically.

Figure 1:
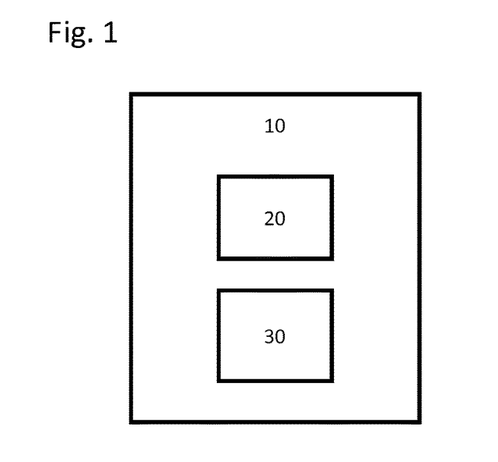
FIG. 1 is a schematic top view of a subway with three-phase induction motor and a first smart phone.
Figure 5:
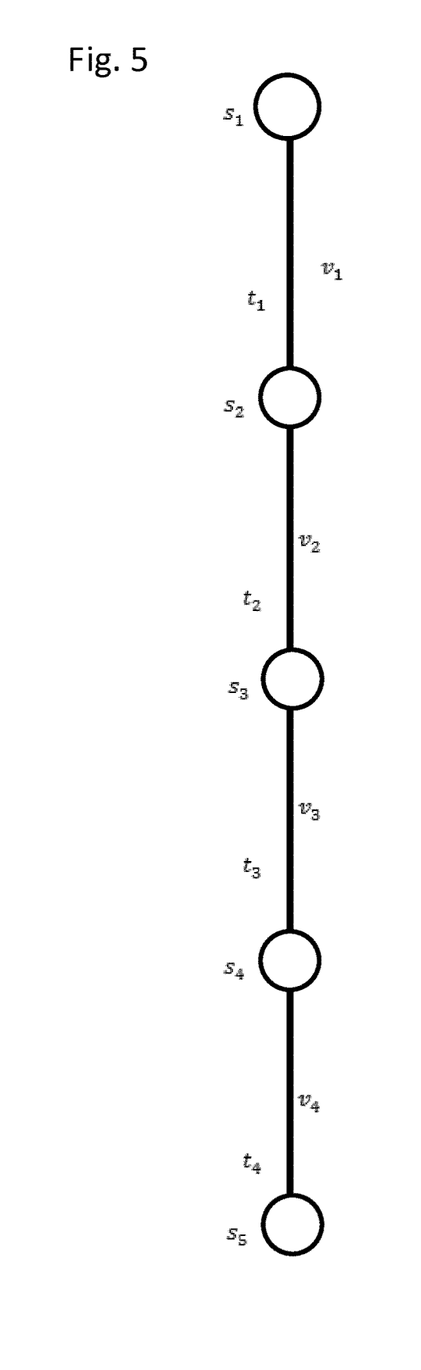
FIG. 5 is the network plan of a public transportation system, which is used for position-determining according to FIG. 2 and FIG. 7.

The goal of position determining in a first development is to estimate the position of a smart phone 30, which is carried along in a subway 10, within a network plan 62 of the public transportation system.

FIG. 1 shows a schematic top view of the subway 10, which is driven by a three-phase induction motor 20, and the first smart phone 30, which is being used by a passenger.

Figure 2:
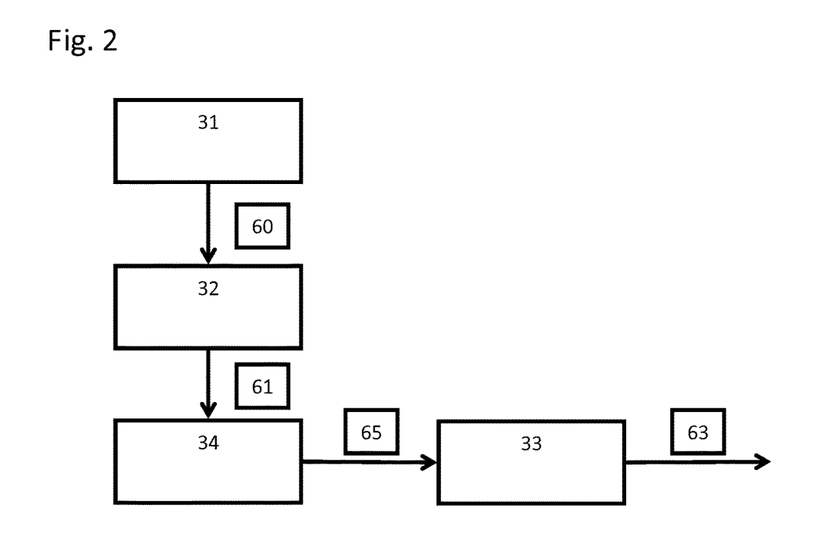
FIG. 2 is a flow diagram of the position-determining by means of the first smart phone according to FIG. 3.

The principal process of the position determining of the first smart phone 30 is shown in FIG. 2.

A magnetometer sensor unit 31 first records the field properties of the magnetic field induced by the three-phase induction motor 20. The magnetometer sensor data 60 and the associated timestamps are transferred to a classification unit 32.

Thereafter, the magnetometer sensor data 60 are assigned a state 61 in the classification unit 32. The respective determined state 61 is then stored in a memory apparatus 34 together with a timestamp.

At defined points in time, such as every minute, for example, or after each new stored state, a position-determining unit 33 reads out states 65 from the memory apparatus 34. The driving times of the subway 10 are estimated from the states 65 and the timestamps. In combination with the network plan 62 and the driving times between stops stored therein, the system according to the invention determines an estimated position 63.

Figure 3:
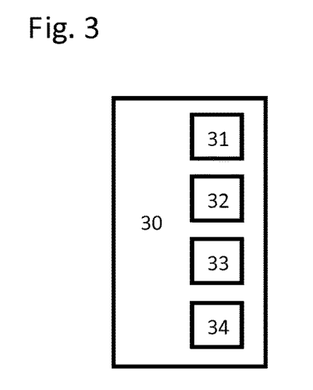
FIG. 3 is the first smart phone according to FIG. 1 with an overview of the components of the first smart phone required for position-determining.

FIG. 3 shows the first smart phone 30 with the components required for position determining. The first smart phone 30 comprises, among other things, the magnetometer sensor unit 31, the classification unit 32, the position-determining unit 33 as well as the memory apparatus 34.

The memory apparatus 34 is developed as flash EEPROM memory. The network plan 62 of a local public transportation system is stored in the memory apparatus 34. According to the invention, other developments of the memory apparatus 34 are possible such as, for example, a network memory solution or an Internet memory solution (cloud storage), which store the data at a physically separate location.

The magnetometer sensor unit 31 is a component of a 9-degree of freedom sensor that is realized with the system-in-package integration approach. The further components that provide the remaining six degrees of freedom are a gyroscope as well as an accelerometer. The magnetometer sensor unit 31 provides a vectorial representation of the field properties of the magnetic field induced by the three-phase induction motor 20. The measured field properties are recorded together with the recording time as tuples.

Figure 4:
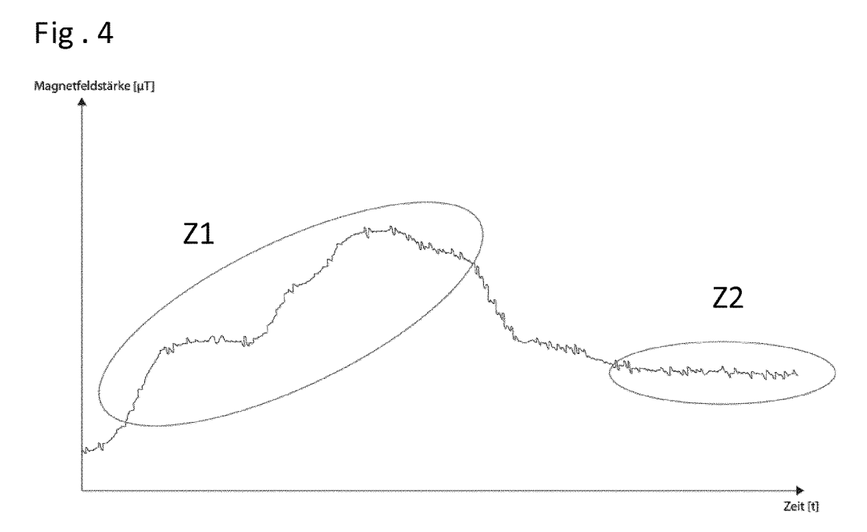
FIG. 4 is a representation of magnetometer sensor data, which were recorded by means of a magnetometer sensor unit.

FIG. 4 shows the measuring values of the magnetic field strength of the three-phase induction motor 20 while the subway 10 is running, which were recorded with the magnetometer sensor unit 31 of the first smart phone 30. The area in which the subway 10 accelerates, and is thus in the state ACCELERATING Z1, and the area in which the subway 10 is standing still, and is thus in the state STANDSTILL Z2, are emphasized.

The classification unit 32 in FIG. 3 is implemented as a support vector machine that has been trained in advance with annotated training data.

The support vector machine interprets the input values as points in a hyperspace. The input values are extracted from the magnetometer sensor data 60. By means of a hyperplane determined by the training, various classes are separated. For the purpose of classification, it is determined on which side of the hyperplane a point is located. In the first exemplary embodiment, the dimensions of the hyperspace are as follows:

amount of magnetic field strength;

n dimensions for the coefficients of an interpolating polynomial of the nth degree, which interpolates the temporal progress of the magnetic field strength.

What is more, the classification unit 32 stores the determined state 61 together with a timestamp in the memory apparatus 34.

The classification unit 32 is trained to distinguish between the classes of the states ACCELERATE and STANDSTILL, with ACCELERATE indicating that the subway 10 is accelerating, and STANDSTILL indicating that the subway 10 is standing still.

The position-determining unit 33 interprets the states 65 determined in the classification unit 32. For example, the state ACCELERATING Z1 is interpreted such that the subway 10 leaves a station of the network plan 62, and the state STANDSTILL Z2 is interpreted such that the subway 10 is in a station of the network plan 62. The drive from one station to the next station is then seen as a sequence of a state ACCELERATING Z1 and STANDSTILL Z2. Furthermore, with the help of the timestamps, which are stored together with the states 65, an estimated driving time of the subway 10 is determined for each completed run between two stations.

The position-determining unit 33 is developed for use of a sequential Monte Carlo method. The position-determining unit 33 moves in a multitude of steps and is developed to use the data of the network plan 62.

The network plan 62, which is shown in FIG. 5 and stored in the memory apparatus, includes five stations $s_1, \ldots, s_5$ as well as four connections $v_1, \ldots, v_4$. Each of the connections connects two stations and is assigned to a drive time $t_1, \ldots, t_4$ provided for this purpose. The network plan 62 is interpreted as an undirected graph with nodes and edges that connect said nodes. The stations of the network plan 62 are represented as the nodes of the graph and the connections of the network plan are represented as the edges of the graph. The drive times $t_1, \ldots, t_4$ of the corresponding connections of the network plan 62 are assigned to the edges of the graph as weights.

With the help of this information, the position-determining unit 33 can estimate the position of the smart phone 30 within the network plan 62 according to the following algorithm:

So-called particles are generated in an initialization phase. They are 2-tuple, to each of which one node of the graph and a particle weight is assigned. The particle weight is a positive, not necessarily whole, number.

Exactly one particle is generated for each node of the graph. The particle weights are the same for all particles during the initialization, such as 1, for example.

The further process comprises the following steps:
1. Perform the following action for each particle:
   For each incident edge of the node associated with the particle, add a number to the particle weight. The size of the number depends on the amount of the difference between the measured driving time of the subway 10 and the weight of the incident edge in the graph. If the difference for the weight of an incident edge is very small, a large number is added to the particle weight. If the difference is large, a small number is added.
2. Generate a new set of particles. The same number of particles is generated as in the initialization phase. The nodes are assigned to particles as follows: The probability of whether a certain node is assigned to a particle depends on the particle weight of the particles in Step 1, which are assigned to the corresponding node. This results in an agglomeration of new particles that were assigned such nodes having particles that were assigned a high particle weight in Step 1. In another consideration, only the particles generated in Step 2 are considered.

The node that was most frequently assigned to a particle in said step represents the station that is outputted to the user as current estimated position 63. If there is a plurality of nodes that are set in the same number of particles, a node is selected from the same by random principle and information about the uncertainty of the position-determining is outputted to the user.
3. The transition of the subway 10 from a first station to a second station is simulated. To that end, it is assumed that per run, the subway always drives only one of the potential connections $v_1, \ldots, v_4$ in the network plan 62.

To simulate the transition, all particles are duplicated often enough that for each node, there are exactly as many particles as there are incident edges to said node. Thereafter, for each particle, the node is exchanged for an adjacent node in the graph.

Then follows Step 1.

The position-determining unit 32 is additionally developed to use WiFi signals 66 and GSM signals 67. To that end, in Step 1 of the previous segment, the WiFi signals 66 and the GSM signals 67 are used as Additional Criteria to determine the weight of the particles.

Figure 6:
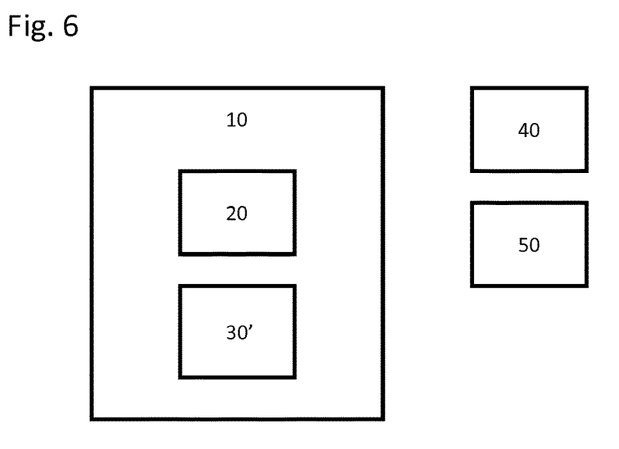
FIG. 6 is a schematic top view of the subway with three-phase induction motor according to FIG. 1 and a second smart phone, in which a GSM tower and a WiFi station are arranged in the vicinity of the subway.

FIG. 6 is a schematic top view according to FIG. 1. Furthermore, a second smart phone 30' is carried in the subway 10 by a passenger. A GSM tower 50 and a WiFi station 40 are arranged in the vicinity of the subway 10.

Figure 7:
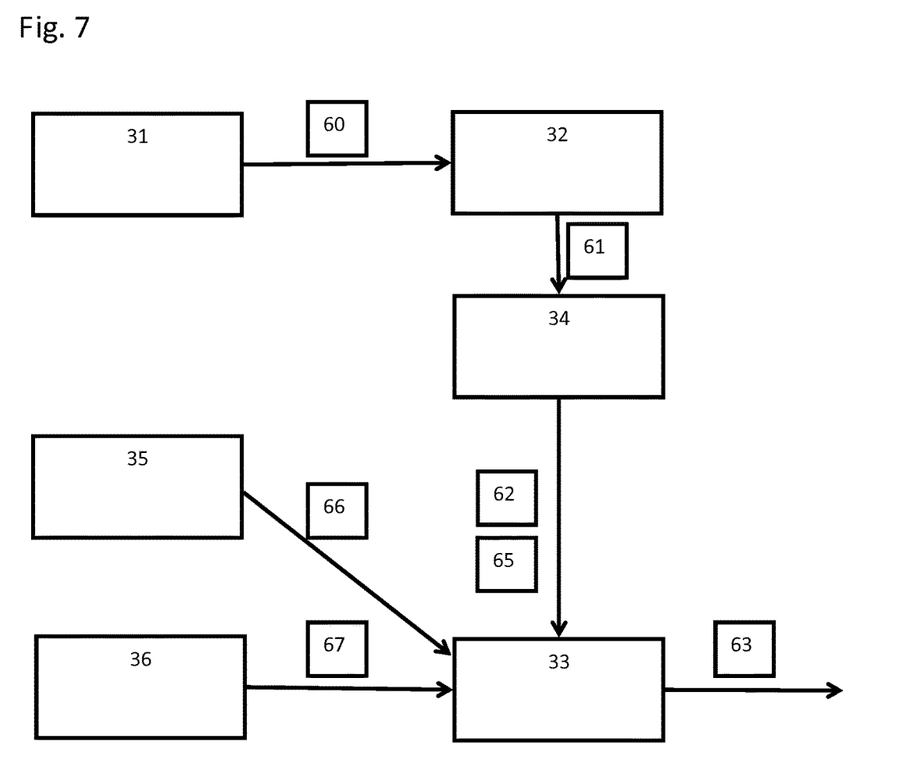
FIG. 7 is a second option of position-determining in the context of the arrangement in FIG. 6.
Figure 8:
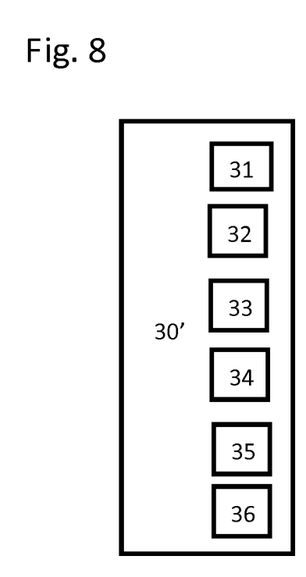
FIG. 8 is the second smart phone in FIG. 6 with overview of the components required for the position-determining according to FIG. 7.

FIG. 7 shows the process of position determining according to the second exemplary embodiment by means of the second smart phone 30' shown in FIG. 8 and the arrangement in FIG. 6. The process is essentially different than the process shown in FIG. 2 in that WiFi signals 66 and GSM signals 67 are used in the position-determining unit 33 to improve estimating the position 63. To this end, the second smart phone 30' records the WiFi signals 66 of a WiFi station 40 with a WiFi receiving unit 35 as well as the GSM signals 67 of a GSM tower 50 with a GSM receiving unit 36. The WiFi signals 66 and the GSM signals 67 are transmitted to the position-determining unit 33 as additional parameters.

FIG. 8 shows the components of the second smart phone 30', which are required for position determining according to FIG. 6. Unlike the first smart phone 30, the GSM receiving unit 36 and the WiFi receiving unit 37 are present as well.

In the second embodiment, the position-determining unit 33 is developed as described for use of GSM signals 67 and WiFi signals 66. To that end, the algorithm used in the first embodiment to determine the position has to be adapted. This is essentially limited to Step 2 of the algorithm:

To better estimate the position 63, the GSM signals 67 and the WiFi signals 66 are evaluated and can be assigned to a number of stations in the network plan 62. This requires advance mapping of the GSM signals 67 and the WiFi signals 66 in the network plan. Generally, this is the case and can be queried via publicly accessible interfaces.

In Step 2 of the algorithm, all particles to which a node representing a station in which the GSM signals 67 or WiFi signals 66 occur was assigned then additionally receive a higher weight. As a result, the driving time is not the only measure used in estimating the position 63, which improves the result.

In a third embodiment, based on the first or second embodiment, the network plan 62 can additionally include the routes of a subway system. The position-determining unit 32 is developed to also determine on which line the passenger is and thus make the position determining more robust with respect to classification errors.

In a fourth embodiment of the invention, the passenger in the subway 10 receives a warning to get off the train after a certain number of stations.

To that end, no network plan 62 is stored in the memory apparatus 34.

In addition, the position-determining unit 33 is implemented by a deterministic method. Specifically, a deterministic decision tree is implemented. In addition to its root node, said decision tree has only a first leaf and a second leaf, e.g. nodes that have no offspring themselves.

Alternatively, a rule is being used where the first leaf is selected when the state ACCELERATING Z1 is applied and the second leaf is selected when the state STANDSTILL Z2 is applied.

When selecting the first leaf, a function "InformUser" is called up, which increases a variable initialized with 1 by 1. The function then checks whether a maximum number MAX has been reached. Further, the value of the variable MAX is specified by the user and states the maximum number of subway stations to be traveled. When MAX has been reached, the user is informed that his destination has been reached. Nothing further has to be done when a state STANDSTILL is applied. The function "InformUser", which implements such a decision tree, is shown in the following as pseudo code:

```
InformUser (state, MAX):    //state from classification unit,
                            //MAX from user of memory
    IF state EQUALS ACCELERATE:
        Count = Load(Count) //       Load count
        If not Count: /// Count is initialized at first execution
            Count = 1
        Count = Count + 1
        If Count EQUAL MAX:
            Inform user ("You have arrived at your destination")
            Count = 1 // program reset
        ELSE:
            Save(Count) // store count
END decision tree
```

In the shown embodiments, it is an advantage that the classification unit 32 and the position-determining unit 33 are implemented as software; the instructions of said software can be read and executed by a processor. This makes sense with respect to development and economy. Furthermore, other embodiments are conceivable as well where the two components are implemented as dedicated hardware components.

REFERENCE SYMBOLS

10 Subway
20 Three-phase induction motor
30 First smart phone
30' Second smart phone
40 WiFi station
50 GSM tower
31 Magnetometer sensor unit
32 Classification unit
33 Position-determining unit
34 Memory apparatus
35 WiFi receiving unit
36 GSM receiving unit
60 Magnetometer sensor data
61 State
62 Network plan
63 Position determining
65 States
66 WiFi signals
67 GSM signals
$t_1$ Time interval 1
$t_2$ Time interval 2
$t_3$ Time interval 3
$t_4$ Time interval 4
$v_1$ Connection 1
$v_2$ Connection 2
$v_3$ Connection 3
$v_4$ Connection 4
$s_1$ Station A
$s_2$ Station B
$s_3$ Station C
$s_4$ Station D
Z1 ACCELERATING
Z2 STANDSTILL The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for determining at least one position of a smart phone, comprising:
   at least one memory apparatus;
   a magnetometer sensor unit to output magnetometer sensor data;
   a classification unit; a position-determining unit configured to determine the position of the mobile terminal, wherein
   the classification unit is configured to
   a) determine operating states of an electric motor of a vehicle, in which the smart phone is carried, driven by means of the electric motor using the magnetometer sensor data, and
   b) store the determined operating states in the at least one memory apparatus; and the position-determining unit reads out the operating states from the at least one memory apparatus and determines the position of the smart phone based at least in part on the operating states stored in the at least one memory apparatus, wherein
   the operating states include at least one first motor state and at least one second motor state, with the first state indicating that a drive voltage is applied at the electric motor and the second state indicating that no drive voltage is applied at the electric motor;

wherein the position-determining unit is developed to use additional signals to determine the at least one position of the smart phone, in particular signals of GSM towers and signals of WiFi access points;

wherein the position-determining unit is designed to calculate from the additional signal data a degree for the quality of the determined position;

wherein the position-determining unit determines the position using a sequential Monte Carlo method and/or a Dynamic Bayes Network and/or a Kalman filter.

2. The device according to claim 1, wherein the classification unit determines the state of the electric motor and/or the vehicle driven by means of the electric motor using a support vector machine and/or a linear discriminant analysis for classification.

3. The device according to claim 2, wherein the classification unit determines the states from a finite quantity of states with a cardinality of less than 5.

4. The device according to claim 1, wherein the classification unit is developed to determine at least one first field state and at least one second field state, with the first field state indicating that the measured values are below a threshold value, and the second state indicating that the values are above a threshold value.

5. The device according to claim 4, wherein the classification unit is developed to determine at least one first vehicle state and at least one second vehicle state, with the first vehicle state indicating that the vehicle is accelerating and/or the second indicating that the vehicle is standing still.

6. The device according to claim 2, wherein the smart phone is developed to store magnetometer sensor data and meta-information, in particular timestamps, wherein the meta-information is to be related to the magnetometer sensor data.

7. The device according to claim 6, wherein the position-determining unit for determining the at least one position of the smart phone receives network data that represent a network plan, comprising at least
   a multitude of stations;
   connections between the stations; and optionally:
   distances between the stations; and
   travel time between the stations.

8. The device according to claim 7, wherein the at least one memory apparatus stores data that provide a characteristic signal path, and that the classification unit compares said data to the magnetometer sensor data to determine the operating states.

9. The device according to claim 8, wherein the at least one memory apparatus stores polynomial coefficients for the representation of characteristic signal paths.

10. The device according to claim 1, wherein the operating states include a third state in which a detected signal increases, and a fourth state in which a detected signal remains constant.

11. A method for determining the position of a smart phone, comprising the acts of:
    detecting of magnetic and/or electric field data of an electric motor;
    storing the magnetic and/or electric field data in at least one memory apparatus;
    classifying a state of the electric motor or a vehicle driven by means of an electric motor;
    storing said states in the at least one memory apparatus; and
    determining a position of the smart phone, which is carried in the vehicle based at least in part on the states stored in the at least one memory apparatus, wherein
    the states include at least one first motor state and an existence of at least one second motor state, with the first state indicating that a drive voltage is applied at the electric motor and the second state indicating that no drive voltage is applied at the electric motor;
    wherein the position is determined using additional signals to determine the position of the mobile terminal, in particular signals of GSM towers and signals of WiFi access points;
    further comprising calculating from the additional signals data a degree for the quality of the determined position;
    wherein the act of determining the position of the mobile terminal is carried out using a sequential Monte Carlo method and/or a Dynamic Bayes Network and/or a Kalman filter.

12. A computer-readable storage medium storing executable instructions that when executed prompt a computer to implement the method according to claim 11.

13. The method according to claim 11, wherein the classifying act determines the state of the electric motor and/or the vehicle driven by means of an electric motor using a support vector machine and/or a linear discriminant analysis for classification.

14. The method according to claim 13, wherein the classifying act determines the states from a finite quantity of states with a cardinality of less than 5.

* * * * *